MEANS AND METHOD FOR OBTAINING IMPROVED COLOR FIDELITY IN COLOR TELEVISION SYSTEMS

Filed Jan. 2, 1951 3 Sheets-Sheet 1

Inventor
PHILIP J. HERBST
By
Attorney

Inventor
PHILIP J. HERBST
By
Attorney

Inventor
PHILIP J. HERBST
By
Attorney

Patented Oct. 6, 1953 2,654,798

UNITED STATES PATENT OFFICE 2,654,798

MEANS AND METHOD FOR OBTAINING IMPROVED COLOR FIDELITY IN COLOR TELEVISION SYSTEMS

Philip J. Herbst, Moorestown, N. J., assignor to Radio Corporation of America, a corporation of Delaware Application January 2, 1951, Serial No. 203,938

10 Claims. (Cl. 178—5.4)

This invention relates to improvements in sequential color television systems and in particular it relates to improvements in color fidelty and color balancing in pictures sequentially produced from a plurality of video signal portions corresponding to component colors.

To obtain good color fidelity in television systems it is necessary to provide color balancing systems for obtaining properly matched amplitudes for each of the primary color video signals. Such systems are necessary to compensate for non-linear responses of television pickup tubes to images passing through the primary color filters, and to allow interchanging of tubes, since the response characteristic of each tube may be slightly different.

Former color balance systems employed separate channels for the different color signals, and adjustment of the gain of each channel was made to secure the proper amplitude for balancing of the color signals. However, phase shifts of different amounts may occur in the separate channels, and such phase shifts disturb the overall color fidelity. It is therefore desirable to provide a system for obtaining color balance in sequentially transmitted video color signals which are to be amplified in a single channel.

In the present invention a conventional three color sequential television system, using red, green and blue primary colors, may be employed. Color balance control is obtained by periodic variation of the gain of a single amplifier channel. In this channel the entire composite sequential video color signal is amplified without phase changes between the respective color signals. In accordance with the invention, restoration of the correct color balance, and proper setting of the black level for each color signal may be accomplished in a single channel video amplifier circuit.

Many color balancing systems do not provide optimum performance in field sequential operation since the direct current component must be restored over intervals of time corresponding to the entire field duration. This causes the average color for every field to be at the proper value, but may cause color brightness distortion over smaller portions of the field. The present system therefore proposes a color balancing system for field sequential operation whereby direct current restoring circuits operate over periods of a line scanning interval.

Further color fidelity and video linearity may be provided in accordance with the invention by controlling the amplitude of negative feedback in a video amplifier at the color sequential frequency. Thus, the linearity of the video amplifier is improved and the gain is separately controlled to provide proper color balance.

It is therefore an object of the invention to provide a sequential color television system with automatic color control circuits which maintain the system in color balance over a wide range of operating conditions.

Another object of the invention is to provide a color balancing control system which is relatively simple, and which may readily be adjusted to compensate for various operating conditions.

A further object of the invention is to provide an electronic color balancing circuit which utilizes a single video amplifying channel and which provides a composite video image having a minimum of phase difference between the video signals for each primary color.

A further object of the invention is to provide an improved color balance system for field sequential operation wherein direct current restoring circuits may operate over periods of a line scanning interval.

There is provided in accordance with the invention means whereby color balance may be obtained with increased color fidelity and video linearity by controlling the amplitude of a negative feedback signal in accordance with color balancing information.

Other objects and advantages of the invention will become more clear to those skilled in the art from a consideration of the following detailed description in connection with the accompanying drawings, wherein.

In sequential types of color television systems the signals representative of color components are transmitted in time division. The time division periods may correspond to field or line scanning periods so that each succeeding field or line occurs simultaneously with the portion of video information relating to a single component color. This invention may be used with either field or line sequential television systems. However, in the following detailed description of the invention certain features are best explained in connection with field sequential operation. Such description is for reason of illustration and not limitation.

Figures 1, 2:
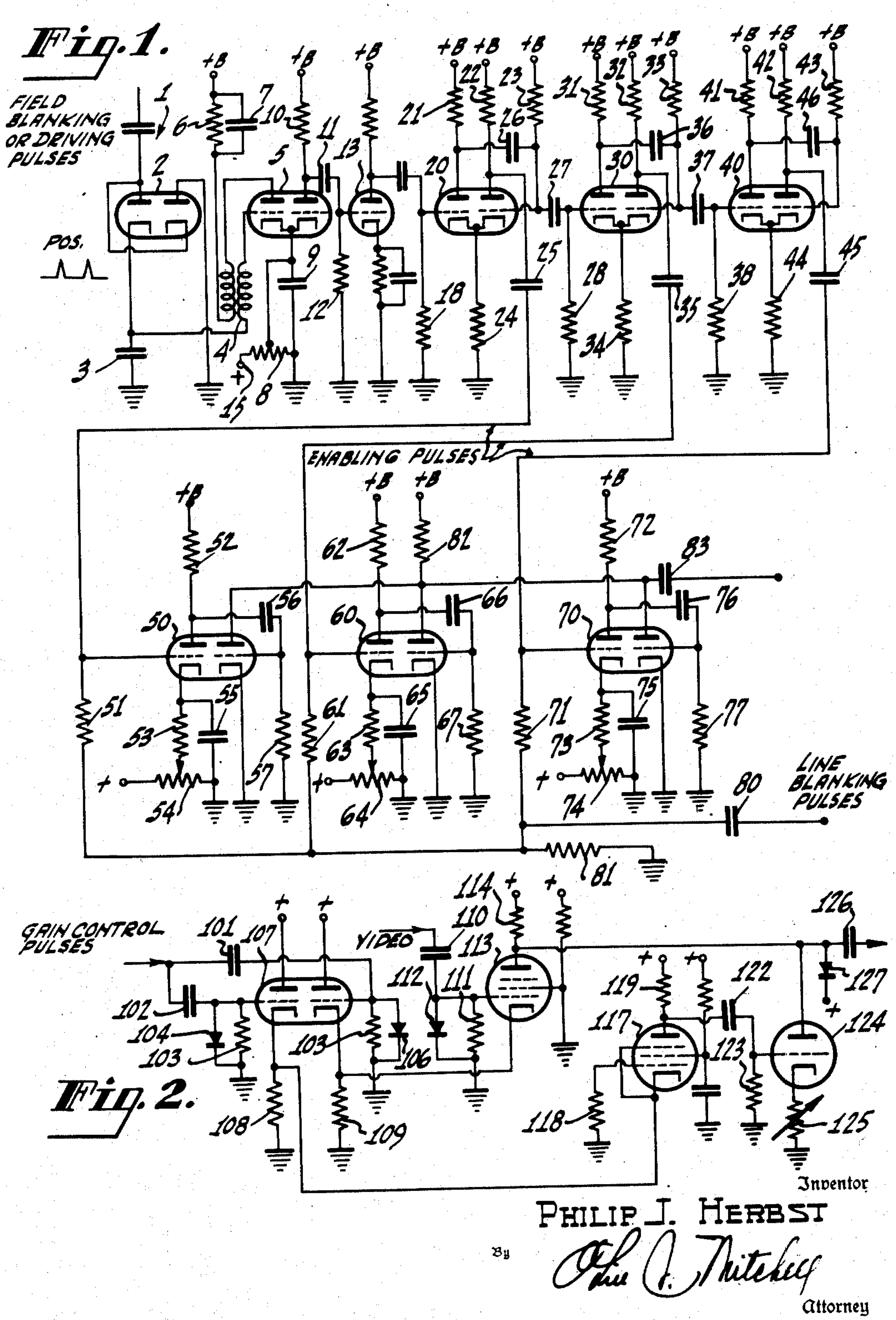
Figure 1 is a schematic circuit diagram of a control pulse circuit embodying one phase of the invention and useful in field sequential television systems.
Figure 2 is a schematic circuit diagram of a color balance system embodying a further phase of the invention.

Figure 1, therefore, schematically shows means for obtaining enabling pulses, which may be successively varied in amplitude at field sequential frequency. The enabling pulses are used to derive gain control pulses, which in turn control the brightness level of the video signal for each primary color. The amplitude of the gain control pulses may be varied at the field sequential frequency and hence the proper color balance may be separately controlled thereby and maintained for each color signal.

Briefly, the method of generating intermingled control pulses of different amplitude, as accomplished by the means of Figure 1, is outlined hereinafter. Thus, for field sequential systems, a series of field blanking or driving pulses is divided by a ratio of 3 to 1 for a tri-color system. Obvious modifications may be made to adapt the invention for other color systems. There is subsequently derived from each of the divided pulses a succession of adjacent enabling pulses, each successive pulse of which lasts for the scansion period of each adjacent sequential color portion of the image. The successive enabling pulses are then combined with individually determined amplitudes to last for the entire frame period of three color fields and thus fully span the time intervals between the divided blanking pulses. The color balance pulses thus provided may be used to control the gain of a video amplifier during each field or color sequence period.

Figure 4:
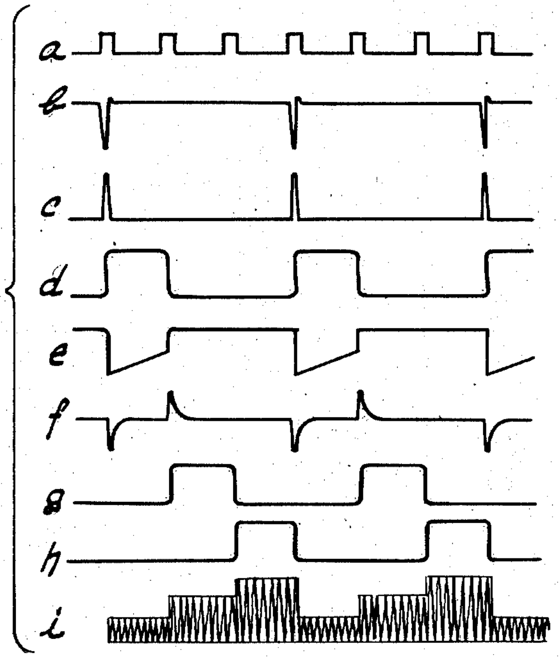
Figures 4 and 5 are diagrams of waveforms used to illustrate the operation of the invention; and, Figures 6 and 7 are schematic diagrams of further means of color balance control in accordance with the invention.

Referring in particular to the schematic diagram of Figure 1, a system is shown which is intended for use in a field sequential system having three color component signals for the red, green and blue primary colors. A counter circuit for dividing the field blanking or driving pulses in the ratio of 3 to 1 comprises electronic tubes 2 and 5. The driving pulses, shown at (*a*) in Figure 4, are applied in a positive sense at the input anode of the counter tube 2 by means of the capacitor 1. The dual diode tube 2 then functions to charge the capacitor 3 to a negative potential such that the one shot oscillator tube 5 is actuated to provide output pulses (Fig. 4*b*) for every third input pulse.

The potential developed across capacitor 3 is applied to the grid of the oscillator tube 5 serially through the grid circuit winding of a feedback transformer 4. The duration of the output pulse of the oscillator circuit is selected by means of the RC time constant circuit 6, 7 connecting the anode of the left hand section of tube 5 to B+ through the feedback winding of the input transformer 4. The output amplitude of the divided pulse is set by means of bias potentiometer 8 in the tube cathode circuit. A by-pass capacitor 9 is provided across the portion of the potentiometer 8 in the cathode return path of the oscillator tube 5, and a positive bias potential is connected to the remaining potentiometer terminal 15. This bias circuit provides a proper positive cathode bias potential for the oscillator tube 5 without providing excessive cathode resistance.

A negative output pulse, shown in Figure 4*b*, is then obtained from the anode resistor 10 of the normally non-conducting right hand portion of the twin triode oscillator tube 5. This negative pulse is applied to an inverter stage 13 by means of a coupling capacitor 11 and input resistance 12. From this stage a positive pulse shown in Figure 4*c* is translated to the input resistor 18 of the first enabling pulse generating stage 20.

Since the enabling pulse generator stages 20, 30 and 40 are identical, the operation of only the first stage need be described. Referring therefore to the first stage, the input (left hand) section of the tube 20 is normally cut off by virtue of the anode current from the normally conducting output (right hand) section through the common unbypassed cathode resistor 24. A large anode current is drawn through the anode resistor 22 of the output section of the first stage tube, since the grid is connected through a resistor 23 to a high positive potential. Thus, the undisturbed condition of the tube 20 permits no anode current to flow through the load resistor 21 of the input section.

When a pulse of sufficiently high amplitude is applied to the grid of the input section of the tube 20, anode current is then drawn through the anode resistor 21 thus producing a negative surge which is transmitted through the capacitor 26 to the grid of the output section, thereby driving this section below cutoff. A charge is induced upon the capacitor 26 which maintains the grid of the output section below cutoff until the decrease of the potential by discharge through resistor 23, as shown by the waveform of Figure 4*e*. Upon discharge to the cutoff level, the output section returns to its normally conducting condition. At this time the input section is again cut off.

The enabling pulse generator stages therefore have a stable condition and an unstable condition. Referring again to the first stage 20, the duration of the unstable condition is determined by the time constants associated with capacitor 26. These time constants are adjusted to provide a pulse length corresponding to the scanning period for the first of the sequential color signals, which in the present embodiment will be the first field scansion period. The output pulse at the anode resistor 22 of the second section will therefore appear as shown in the waveform of Figure 4*d*.

It will be noted that, at the end of the unstable period, the sudden cessation of plate current in the resistor 21 induces a positive pulse in the capacitor 26. This is transmitted to the grid of the next stage 30 through the coupling capacitor 27. The coupling capacitor 27 and the grid input resistor 28 of the succeeding stage 30 therefore comprise a differentiating circuit producing a wave form, such as shown in Figure 4*f*, at the grid of the first section of the succeeding stage.

The operation of this succeeding stage 30 is the same as the preceding stage and serves to produce a pulse of controllable length corresponding to the second field sequence scansion period. In a similar manner stage 40 is driven by stage 30 so that each of the succeeding field scansion periods corresponding to the waveforms shown in Figures 4*d*, *g* and *h* are respectively provided at the output terminals of stages 20, 30 and 40. The three waveforms 4*d*, *g* and *h* then comprise enabling pulses which occupy the entire time period between the pulses generated by dividing the blanking pulses as shown in 4*b* and which therefore comprise one complete three color field scanning cycle or frame.

As will hereinafter be explained in detail these enabling pulse waves can be separately varied in amplitude to provide gain control pulses which may be applied to dynamically control the gain or color balance of a single amplifying stage carrying the composite video signal during each color field. The gain control pulses are derived from the enabling pulses by means of three gain control stages 50, 60 and 70 of Figure 1. Each stage is shown as comprising a similar double triode circuit, and since each stage is similar, only the first 50, will be described in detail. The positive going output enabling pulse of tube 20 is applied to the grid of tube 50 by means of the coupling capacitor 25 and the series grid resistors 51 and 81. Under normal conditions this section of the tube is maintained below plate current cutoff by adjustment of the cathode potential. This adjustment is made by means of potentiometer 54 in connecting a variably adjustable portion of a positive potential source to the cathode resistor 53 of the left hand triode sections.

In addition to the respective enabling pulses applied to the grids, a series of positive line blanking pulses is inserted across the resistor 81, which is common to the grid input circuits of each of the gain control tubes 50, 60 and 70. The cathode potential is then chosen so that the application of both the line pulse and the enabling pulse is necessary to produce an output waveform across the anode resistor 52. Thus, when a positive enabling pulse and the line blanking pulses simultaneously appear across resistor 51, the tube conducts and pulses of line frequency appear in the output circuit. The amplitude of these pulses for each field is determined by the respective settings of bias potentiometers 54, 64, 74 in each stage 50, 60 and 70.

Each succeeding gain control stage is set at any appropriate predetermined gain level in order to provide the desired overall output waveform, which is shown in Figure 4*i* and which is developed across the anode resistor 82, common to the right hand section of each of the gain control tubes 50, 60 and 70. The right hand sections of the tubes serve to invert and isolate the enabling pulses from the first section, from which the signal is transferred by means of the coupling capacitor 56 and input grid resistor 57. Thus, an output wave train of line blanking pulses, the amplitude of which is successively varied at field sequential rate, may be derived from the color balance circuit output resistor 82 and will appear at capacitor 83.

A circuit for employing the gain or color balance control pulses appearing at capacitor 83 is shown in Figure 2. Included in this circuit is means for balancing out direct current pedestal variations of the color balance or gain control pulse, so as to provide a constant reference black level for each color signal. This circuit, as well as the other circuits of the invention, enables reinsertion of the direct current level at a further point in the television system and permits the signals during each color field to be reinserted at the proper reference levels with respect to each other. Since the control pulses occur at line frequency, it is only necessary for the reinserting circuits to maintain levels over the period of a line scanning interval. Because the color balance is dependent upon the precision maintenance of the black level over the entire period of each field, it is apparent that better color fidelity will be achieved with circuits required to hold signal levels only over the relatively short line scanning intervals. Thus, by providing a train of line blanking pulses, the amplitude of which is successively varied at the field scansion frequency, improved color fidelity is obtained.

Gain control pulses of the nature hereinbefore described are applied through capacitors 101 and 102 to both grids of the double triode 107, comprising a pair of cathode followers. Clamping of the line blanking pulses is accomplished in both of these grid circuits by diodes 104 and 106, which are connected in parallel with the respective grid resistors 103 and 105. A pair of output voltages, identical in waveshape, therefore may be obtained across the cathode resistors 108 and 109 of each triode section. Resistor 109 is commonly connected as a cathode resistor for a following video amplifier tube 113 and comprises for that tube a cathode input circuit across which the gain control pulses are developed.

A negative polarity video input signal is also applied to the amplifier 113, at the control grid terminal, by means of the capacitor 110. Direct current is restored to the video signal by means of a diode 112 paralleling the grid input resistor 111. During the line scanning intervals, the cathode of tube 113 is driven in a positive direction by pulses of plate current from the cathode follower 107. Since the gain control pulses are of different amplitudes for the successive sequential signal portions, this results in the application of the video signal to different portions of the mutual characteristic of amplifier tube 113 and the consequent periodic variation of gain of video signals in this stage. The amplifier tube 113 should, therefore, be of the variable mu type.

Application of the gain control pulses cause such a change in the cathode-to-grid potential that direct current pedestals are produced in the output circuit of the amplifier tube in addition to the variable gain of the video signals. These pedestals are normally mixed with the gain controlled video signal in the anode resistor 114 of the amplifier, and as such they disturb the normal reference black level of the video signals. To compensate for this, pulses developed across resistor 108 are applied to the cathode of a further amplifier tube 117 having substantially identical operating characteristics with the video amplifier tube 113. The output wave of the amplifier tube 117, as developed across the output resistor 119, therefore contains pedestals of equal amplitude and of the same polarity as those appearing across the output resistor 114 of the tube 113. These pulses developed at the anode resistor 119 are coupled by capacitor 122 to the grid resistor 123 of the following inverter tube 124.

The inverter tube has an unbypassed cathode resistor 125 to provide sufficient degeneration for essentially linear operation. This resistor 125 is made variable so that exact output pedestal amplitude of the tube 124 may be selected for cancelling the opposite polarity pedestal in the video amplifier anode resistor 114. To accomplish the cancellation, the anode of the inverter tube 124 is connected in parallel with the anode of the video amplifier tube 113. In this manner a constant reference level is established so that the normal brightness level may be restored for small elements of each sequential color portion of the video signal by the direct current restoring means in the grid circuit of tube 113. Thus, it is clear that the direct current restoring circuit may operate for periods of a single line rather than for the period of an entire field, resulting in improved color picture reproduction fidelity.

A limiter, indicated as the diode 127, is connected to the common anode connection of tubes 113 and 124 to limit any excess amplitude of the control pulses. This serves to remove any excursion in the positive direction, in excess of a predetermined amount, so that a constant reference level is provided in the output signal, which may be coupled to succeeding stages through capacitor 126.

Figure 5:
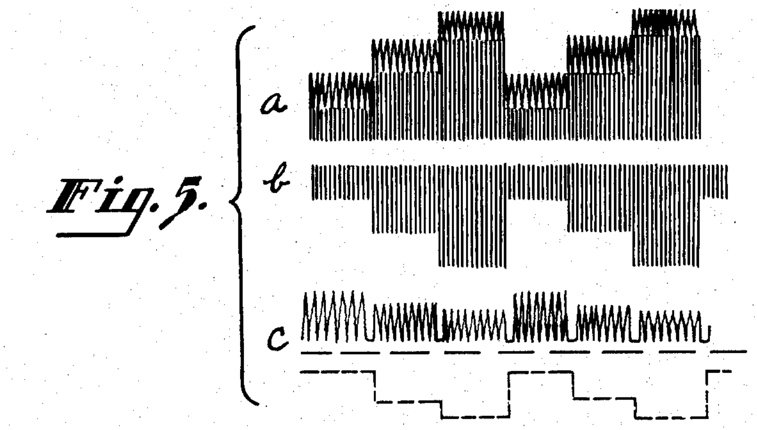

Waveforms of circuit operation of the system of Figure 2 are shown in Figure 5. Thus, Figure 5*a* illustrates the effective output anode current of the video amplifier tube, wherein the video signal is superimposed upon the gain control pulses. Figure 5*b* shows the anode current waveform of tube 124 which combines in the anode resistor 114 to cancel out the direct current pedestal variations as shown in Figure 5*c*. The dotted line 191 in Figure 5*c* illustrates the point at which the limiter 127 operates to prevent any decrease in total current through the resistor 114. In this manner direct current information is effectively restored into the output video signal, and the gain of each color component may be individually controlled to provide the necessary color balance.

Figure 3:
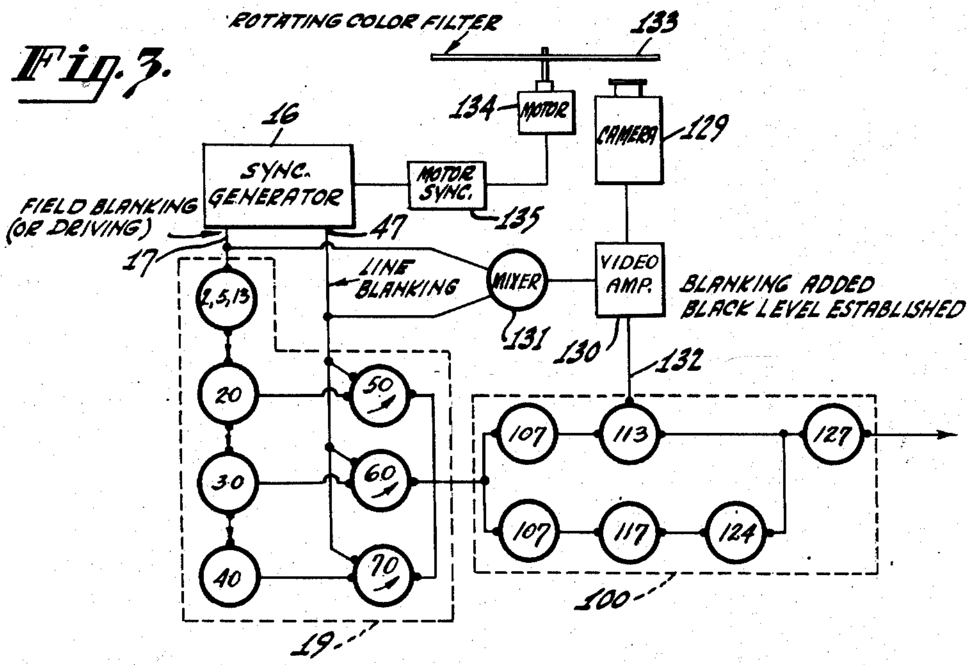
Figure 3 is a block diaphragm of a field sequential color television transmitter system embodying the invention.

Operation of the invention may be explained in conjunction with a transmitter video circuit. Thus, the block diagram of Figure 3 illustrates the method of controlling the gain and color balance in field sequential color television transmitters. In this diagram a synchronizing pulse generator 16 is supplied to provide field blanking or driving pulses at the output terminal 17. These pulses are applied through the frequency dividing circuits 2, 5 and 13 to the respective enabling pulse generators 20, 30 and 40, whose output signals are coupled to the succeeding gain control stages 50, 60 and 70. Individual gain control in each of these stages is indicated by the enclosed arrow. In addition line blanking pulses are supplied from the pulse generator terminal 47 to the gain control or color balance pulse stages 50, 60 and 70. From the entire control pulse circuit 19, the common output signal of these three color balance stages is then coupled to the entire color balance system 100, which employs the cascade connected cathode follower 107, video amplifier 113 and diode limiter 127 circuits. An associated pedestal compensating circuit 117 and 124 is connected in parallel with the cascade video amplifier and cathode follower circuits.

Video signals are provided at the camera 129 and are appropriately modified at the video amplifier 130 by means of added field blanking and line blanking pulses from the mixer circuit 131, so that the proper composite video signal is inserted into the video amplifier 113 by means of the lead 132. Although the camera pick-up system may be any one of the many known or desired arrangements, a field sequential system having a rotating color disc 133 is illustrated because of its simplicity. In this system the disc drive motor 134 may be synchronized by means of the motor synchronization circuit 135 to which the proper synchronizing control pulses are applied from the synchronization generator 16. In considering the block diagram of the transmitter circuit, it is readily recognized that the circuits of the invention are not limited thereto, but may readily be used in a similar manner in television receiving circuits, or the like.

It may happen that it is difficult to realize full video fidelity or linearity when a video amplifier is operated on different portions of its characteristic curve. Thus, in some instances an improved color balance control circuit is preferred which will provide optimum linearity in reproduction of the video signals. This is accomplished by the feedback method of color balance control shown in connection with the circuit of Figure 6. This circuit, in essence, comprises a signal conveying means for video input signals, wherein there are provided a negative feedback circuit and means for varying the amplitude of the feedback voltage in synchronism with the aforedescribed series of color balance pulses.

Video signals are applied to the grid terminal of an input cathode follower tube 201 by a coupling capacitor 202. Video signals thus inserted at the grid resistor 203 of the cathode follower tube 201 are employed to drive the grid of the succeeding amplifier 206 from cathode resistor 205. A direct current restoring diode 204 is connected in parallel with the grid resistor 203 to provide input signals having the proper black level. Output video signals appearing across the cathode resistor 205 and coupled therefrom to the grid of the amplifier tube 206, are amplified in tube 206 to appear across the anode resistor 207, from which they may be connected to further stages through capacitor 234.

Degenerative or negative feedback from the output resistor 207 of the amplifier tube 206 is coupled back to the input circuit of the amplifier tube 206 by means of a series of cathode follower tubes 210, 220 and 230. These stages are identical so that description of only one stage will suffice for an understanding of this phase of the invention. The output pulses of each of the aforementioned enabling pulse generator tubes 20, 30 and 40 are applied to the respective screen grid terminals of the corresponding cathode follower stages 210, 220 and 230. In the first stage 210, the coupling means comprises capacitor 212 and the control pulses are developed across the screen grid resistor 211. The control grid circuit of the cathode follower is normally biased below cutoff by the proper negative potential connected to a series grid resistor 209.

Signals developed across the control grid circuit resistor 209 have direct current reinserted by the parallel diode 253. The signals are coupled from the video amplifier 206 by means of the capacitor 208. Therefore the signal applied to the grid of the cathode follower 210 will correspond to the video picture signal component, which may be used as degenerative feedback to both control the gain of amplifier 206 and also to improve the video signal linearity.

An adjustment of the degenerative output signal of the cathode follower 210 may be made by varying a low impedance anode resistor 213. The cathode follower load resistor, however, essentially comprises the common load resistor 205 of the video input cathode follower circuits which is the video amplifier input resistor. Thus, the enabling pulses permit the gating means or cathode follower 210 and each succeeding cathode follower 220, 230 to periodically conduct at the field sequence frequency to degeneratively feed back the video signal at average amplitudes for each color component as determined by the separate setting of anode resistors 213, 223, 233 of the respective cathode followers 210, 220 and 230.

The gain of the amplifier is therefore controlled in accordance with the enabling pulses in a manner which will improve the video output circuit linearity. In this circuit, gain control may obviously be separately effected for each sequential color by separately setting the variable anode resistor of each feedback stage.

Figures 6, 7:
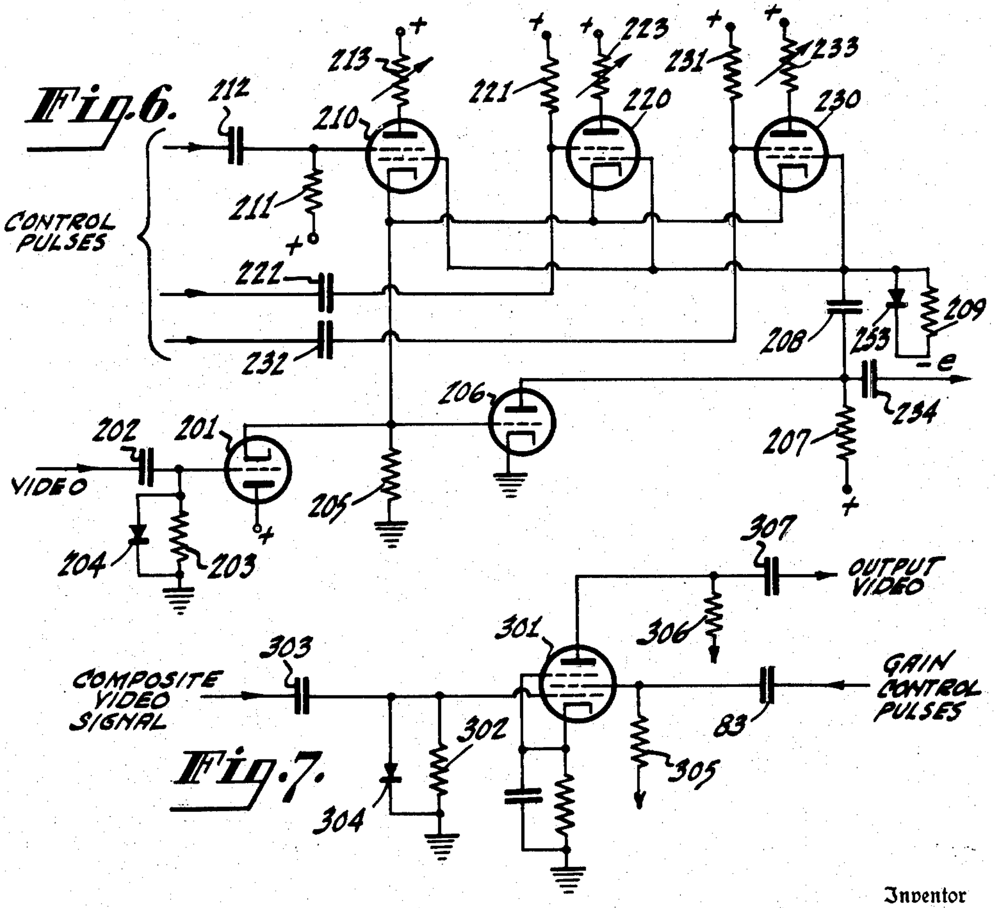

In the feedback color balance circuit of Figure 6, the enabling pulse output voltage of tubes 20, 30 and 40 of Figure 1 may be directly applied to obtain pulses of proper time periods for controlling the feedback amplitude provided by each of the cathode follower tubes 210, 220 and 230. The color balancing controls then comprise the anode resistors 213, 223, 233 of the color balance cathode followers 210, 220, 230 and they may be adjusted to provide the proper overall video gain level for each color component. In addition to the proper value of feedback, circuit components may be selected to minimize any variations caused by the direct current pedestal of the control pulses. For example, the screen grid resistors and voltages for each stage may be chosen to exactly compensate for the pedestals. Therefore a more simplified color balance circuit with a more linear video output signal is provided in this embodiment of the invention.

A simple means of varying the gain of a video amplifier with the gain control pulses developed at the output capacitor 83 of Figure 1, may be similar to that shown in Figure 7, wherein a video amplifier tube 301 is provided with a composite video signal coupled in a conventional manner to a grid resistor 302 by means of a capacitor 303. A direct current reinsertion diode 304 is supplied in shunt with the grid resistor.

The gain control pulses are inserted by means of the capacitor 83 to the screen grid resistor 305 of the amplifier tube 301. Thus, the gain of the amplifier is variably controlled for each color component signal by changing the screen grid potential with the gain control pulses at the field sequence frequency. The output video signal is developed across the anode resistor 306 and may be applied to a suitable color monitor by means of the output coupling capacitor 307. Thus, it is clear that the gain control circuit of the invention is useful in conjunction with different video amplifiers, and is not necessarily limited to use with a specially designed amplifier circuit.

In accordance with the present invention there is therefore provided improved means for securing and maintaining color balance control. Improved color balance is obtained for field sequential operation, in accordance with the invention, by permitting direct current restoring circuits to operate over time periods corresponding to the line frequency. Thus, color fidelity is maintained throughout the entire field scansion period rather than being limited to the average for the entire field.

Also in accordance with the invention, improved color balance control is secured in a single amplification channel for the entire composite video signal. Improved color fidelity results by precluding differences in phase change which may occur in a plurality of channels.

What is claimed is:

1. Apparatus for providing color balancing and improved color fidelity in a sequential color television system, comprising in combination, means providing a blanking pulse train, a countercircuit for dividing the blanking pulses in a ratio of 3 to 1, a series of three cascade coupled enabling pulse generating circuits, means coupling the divided blanking pulses for actuating the first pulse generating circuit to an unstable stage of operation, means causing each pulse generating circuit to actuate the succeeding pulse generating circuit into a like unstable stage of operation upon a return to a stable state of operation of the preceding pulse generating circuit, the generated enabling pulses lasting for an unstable operation period of fixed predetermined duration thus determining the image portion sequence period, and means for combining the generated pulses with an output amplitude individually determined for each pulse.

2. Apparatus as defined in claim 1 including, a video signal amplifier device, and means for controlling the gain of said device by said combined generated pulses, whereby the brightness level of the signal for each color may be separately adjusted and maintained.

3. Apparatus as defined in claim 1 wherein the image portion sequence period is the field scansion period and there is included means for generating line blanking pulses, and means causing said combined generated pulses to be produced only upon simultaneous insertion of said line blanking pulses and said generated pulses at said combining means, thus providing an output waveform comprising a train of line blanking pulses, the amplitude of which is successively varied at the field scansion frequency.

4. Apparatus as defined in claim 3 including a video signal amplifier device, means for controlling the gain of said device by said train of line blanking pulses, and means for combining in said amplifier signals to balance out direct current pedestal variations, thus providing a constant reference level for operation of direct current restoring circuits.

5. A color balance control circuit for television systems comprising, a signal conveying circuit for video input signals, an amplifier device in said signal conveying circuit, a negative feedback circuit for said amplifier device, means for generating a series of color balance pulses at the image portion sequence frequency, and means gating said feedback circuit in synchronism with the generated color balance pulses.

6. A circuit as defined in claim 5 wherein the feedback circuit components are selected such that any tendency for variations of the direct current level at the output terminals of the signal conveying circuit due to the presence of the color balance pulses is minimized.

7. Apparatus for providing color balance in a sequential color television system comprising in combination, a circuit providing a series of pulses at color sequential frequency, a separate pulse being provided for each primary color and occuring during the color scanning period for the primary color, a video amplifier having a negative feedback path, and means operable by said pulses for separately controlling the amplitude of said feedback during each color scanning period.

8. A system for providing color balance in a sequential color television system, comprising in combination: a circuit providing a train of controlled pulses having a television blanking frequency and whose amplitude represents color balance information such that the amplitudes of successive pulses vary in a predetermined manner; a video amplifier circuit for conveying color television signals to be color balanced; and means for controlling the gain of said amplifier circuit in accordance with said pulses.

9. A system, as defined in claim 8, wherein means are provided for inverting the polarity of said pulses; and means provided for mixing in the output circuit of said amplifier said inverted pulses to establish in said amplifier circuit a black reference level.

10. A system for generating control pulses for providing color balancing in a sequential color television system employing line blanking pulses, or the like, comprising in combination, means for deriving a train of sequential enabling pulses of a time duration equal to the successive scansion periods of the sequential colors and in repeating groups corresponding to the sequential colors, means for individually controlling the amplitudes of the pulses in each group corresponding to each color whereby the proper amplitude ratios may be obtained for color balance control means for superimposing line blanking pulses upon said train of pulses.

PHILIP J. HERBST.

References Cited in the file of this patent

UNITED STATES PATENTS

| Number | Name | Date |
|---|---|---|
| 2,389,039 | Goldsmith | Nov. 13, 1945 |
| 2,406,760 | Goldmark | Sept. 3, 1946 |
| 2,438,269 | Buekbee | Mar. 23, 1948 |
| 2,505,589 | Somers | Apr. 25, 1950 |
| 2,579,971 | Schade | Dec. 25, 1952 |